United States Patent
Mino et al.

(10) Patent No.: US 11,466,146 B2
(45) Date of Patent: Oct. 11, 2022

(54) ETHYLENE-BASED POLYMER, METHOD OF PRODUCING ETHYLENE-BASED POLYMER, AND FILM

(71) Applicant: SUMITOMO CHEMICAL COMPANY, LIMITED, Tokyo (JP)

(72) Inventors: Takayuki Mino, Chiba (JP); Toshihiko Manami, Chiba (JP); Takaya Ichimiya, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/360,321

(22) Filed: Jun. 28, 2021

(65) Prior Publication Data

US 2021/0403687 A1    Dec. 30, 2021

(30) Foreign Application Priority Data

Jun. 30, 2020  (JP) .............................. JP2020-112821
Mar. 22, 2021  (JP) .............................. JP2021-047383

(51) Int. Cl.
| | | |
|---|---|---|
| C08L 23/06 | (2006.01) |
| C08J 3/00 | (2006.01) |
| B29C 48/36 | (2019.01) |
| C08K 5/14 | (2006.01) |

(52) U.S. Cl.
CPC .............. *C08L 23/06* (2013.01); *B29C 48/36* (2019.02); *C08J 3/005* (2013.01); *B29K 2023/06* (2013.01); *C08K 5/14* (2013.01); *C08L 2203/16* (2013.01); *C08L 2207/066* (2013.01)

(58) Field of Classification Search
CPC ............. C08L 23/30; C08F 8/06; C08F 10/02
See application file for complete search history.

(56) References Cited

U.S. PATENT DOCUMENTS

2018/0002517 A1 * 1/2018 Canich .................... C08F 2/001

FOREIGN PATENT DOCUMENTS

| CA | 3052507 A1 * | 8/2018 | ............ C08J 9/0061 |
| JP | 2010-144134 A | 7/2010 | |
| WO | WO-2017127185 A1 * | 7/2017 | ............. B01J 27/10 |

* cited by examiner

*Primary Examiner* — Robert C Boyle
(74) *Attorney, Agent, or Firm* — Meunier Carlin & Curfman LLC

(57) ABSTRACT

Provided are an ethylene-based polymer capable of obtaining a film in which thickness unevenness is reduced, a method of producing the ethylene-based polymer, and a film containing the ethylene-based polymer. In the ethylene-based polymer according to the present invention, the following Expressions (1) and (2) are satisfied:

$$0.362 \leq \eta L^{1,256\%}/\eta L^{10\%} \leq 0.466 \quad (1)$$

$$0.0282 \leq I5^{2,506\%}/I1^{2,506\%} \leq 0.0328 \quad (2).$$

11 Claims, No Drawings

ETHYLENE-BASED POLYMER, METHOD OF PRODUCING ETHYLENE-BASED POLYMER, AND FILM

CROSS-REFERENCE TO RELATED APPLICATIONS

This application is a non-provisional utility U.S. Application, which claims priority to and benefit of Japanese Application serial number 2021-047383 filed Mar. 22, 2021, and of Japanese Application serial number 2020-112821 filed Jun. 30, 2020, the contents of which are fully incorporated by reference and made a part hereof.

BACKGROUND OF THE INVENTION

Field of the Invention

The present invention relates to an ethylene-based polymer, a method of producing the ethylene-based polymer, and a film containing the ethylene-based polymer.

Description of the Related Art

As a film for packaging foods and the like, a laminate film is widely used in the related art, the laminate film being obtained by laminating a substrate film and a film formed of an ethylene-based polymer by melt-extruding a resin composition containing an ethylene-based polymer on the substrate film. In a case where such a film formed of an ethylene-based polymer is used on a surface of the laminate film, the film is suitably used as a sealant layer, and in a case where the film is used inside the laminate film, the film is suitably used as an adhesive layer. Therefore, it is required for the film to have excellent transparency and adhesive strength.

As a material for the ethylene-based polymer used in the laminate film, for example, JP-A-2010-144134 discloses a polyethylene-based resin material for lamination, the polyethylene-based resin material being obtained by mixing 0.001 to 1.0 part by weight of a radical initiator with 100 parts by weight of a polyethylene-based resin composition containing 5 to 95 wt % of a high-pressure radical polymerization polyethylene-based resin and 95 to 5 wt % of a high-pressure radical polymerization polyethylene-based resin other than the above polyethylene-based resin, and modifying the mixture.

SUMMARY OF THE INVENTION

In order to improve transparency and adhesive strength of the film formed of an ethylene-based polymer, it is required to reduce thickness unevenness of the film and thus to improve flatness. However, the film formed of an ethylene-based polymer of JP-A-2010-144134 has a problem in that thickness unevenness is large.

The present invention has been made in view of such a problem, and an object of the present invention is to provide an ethylene-based polymer capable of obtaining a film in which thickness unevenness is reduced, a method of producing the ethylene-based polymer, and a film containing the ethylene-based polymer.

According to the present invention, there is provided an ethylene-based polymer, in which the following Expressions (1) and (2) are satisfied:

$$0.362 \leq \eta L^{1,256\%}/\eta L^{10\%} \leq 0.466 \tag{1}$$

wherein, $\eta L^{10\%}$ represents a viscosity (Pa·sec) at the highest shear rate of the ethylene-based polymer at a strain of $\gamma_0=10\%$ of the ethylene-based polymer measured by a large amplitude oscillatory shear (LAOS) method at 150° C. and 0.05 Hz, and $\eta L^{1,256\%}$ represents a viscosity (Pa·sec) at the highest shear rate of the ethylene-based polymer at a strain of $\gamma_0=1,256\%$ of the ethylene-based polymer measured by the LAOS method at 150° C. and 0.05 Hz, and $$0.0282 \leq I5^{2,506\%}/I1^{2,506\%} \leq 0.0328 \tag{2}$$

wherein, $I1^{2,506\%}$ represents an intensity of a first harmonic obtained by Fourier-transforming a response stress of the ethylene-based polymer at a strain of $\gamma_0=2,506\%$ of the ethylene-based polymer measured by the LAOS method at 150° C. and 0.05 Hz, and $I5^{2,506\%}$ represents an intensity of a fifth harmonic obtained by Fourier-transforming a response stress of the ethylene-based polymer at the strain of $\gamma_0=2,5065$ of the ethylene-based polymer measured by the LAOS method at 150° C. and 0.05 Hz.

According to the present invention, a method of producing the ethylene-based polymer includes: a step (A) of melt-kneading a mixture containing an ethylene-based polymer and a radical initiator at a temperature $T^A$(° C.); a step (B) of melt-kneading the melt-kneaded product obtained in the step (A) at a temperature $T^B$(° C.); and a step (C) of melt-kneading the melt-kneaded product obtained in the step (B) at a temperature $T^C$(° C.), in which the following Expression (11) is satisfied:

$$T^A < T^B < T^C \tag{11}$$

According to the present invention, a film contains the ethylene-based polymer.

According to the present invention, it is possible to provide an ethylene-based polymer capable of obtaining a film in which thickness unevenness is reduced, a method of producing the ethylene-based polymer, and a film containing the ethylene-based polymer.

DETAILED DESCRIPTION OF THE PREFERRED EMBODIMENTS

Hereinafter, embodiments of the present invention will be described, but the present invention is not limited to the following embodiments.

<Ethylene-Based Polymer>

In an ethylene-based polymer according to the present embodiment, the following Expressions (1) and (2) are satisfied:

$$0.362 \leq \eta L^{1256\%}/\eta L^{10\%} \leq 0.466 \tag{1}$$

wherein, $\eta L^{10\%}$ represents a viscosity (Pa·sec) at the highest shear rate of the ethylene-based polymer at a strain of $\gamma_0=10\%$ of the ethylene-based polymer measured by a large amplitude oscillatory shear (LAOS) method at 150° C. and 0.05 Hz, and $\eta L^{1,256\%}$ represents a viscosity (Pa·sec) at the highest shear rate of the ethylene-based polymer at a strain of $\gamma_0=1,256\%$ of the ethylene-based polymer measured by the LAOS method at 150° C. and 0.05 Hz, and $$0.0282 \leq I5^{2,506\%}/I1^{2,506\%} \leq 0.0328 \tag{2}$$

wherein, $I1^{2,506\%}$ represents an intensity of a first harmonic obtained by Fourier-transforming a response stress of the ethylene-based polymer at a strain of $\gamma_0=2,506\%$ of the ethylene-based polymer measured by the LAOS method at 150° C. and 0.05 Hz, and $I5^{2,506\%}$ represents an intensity of a fifth harmonic obtained by Fourier-transforming a response stress of the ethylene-based polymer at the strain of $\gamma_0=2,506\%$ of the ethylene-based polymer measured by the LAOS method at 150° C. and 0.05 Hz.

Here, the LAOS method is a method of applying a large and fast shear strain to a sample and observing and analyzing a response stress of the sample.

ηL means a value obtained by applying a sinusoidal shear strain (deformation) to a sample and plotting a deformation rate and a response stress to create a Lissajous curve and dividing a response stress at the highest deformation rate by a deformation rate at that time, that is, a viscosity. When ηL is measured while changing a magnitude of the shear strain (deformation), ηL varies depending on a structure of the ethylene-based polymer. Specifically, when the shear strain (deformation) is large, the ethylene-based polymer is oriented in a shear direction (deformation direction). Therefore, ηL is decreased. A decrease level of ηL varies depending on ease of the orientation of the ethylene-based polymer in the shear direction (deformation direction). When the ethylene-based polymer is difficult to be oriented in the shear direction (deformation direction), it means that the ethylene-based polymer is entangled and difficult to move. Therefore, it can be said that $\eta L^{1,256\%}/\eta L^{10\%}$ is a parameter that reflects the amount of entangled branch structure.

In general, in the measurement of $\eta L^{10\%}$, a sinusoidal shear strain of 0.05 Hz is applied to a sample for 6 cycles, and an average value of values obtained in the latter 3 cycles is a measured value. In general, a time required for the measurement of $\eta L^{10\%}$ is 120 seconds.

In general, in the measurement of $\eta L^{1,256\%}$, a sinusoidal shear strain of 0.05 Hz is applied to a sample for 6 cycles, and an average value of values obtained in the latter 3 cycles is a measured value. In general, a time required for the measurement of $\eta L^{1,256\%}$ is 120 seconds.

In general, the measurement of $\eta L^{10\%}$ is performed first, and ηL is measured while increasing a strain of $\gamma_0$ stepwise. Specifically, ηL is measured while increasing a strain of $\gamma_0=10\%$ to 100% (that is, $\gamma_0=10\%$, 13%, 16%, 20%, 25%, 32%, 40%, 50%, 63%, 79%, or 100%) in 10 logarithmically evenly spaced steps. Similarly, ηL is measured while increasing a strain of $\gamma_0=100\%$ to 1,000% in 10 logarithmically evenly spaced steps, and ηL is measured while increasing $\gamma_0=1,0001$ to 10,000', in 10 logarithmically evenly spaced steps. As described above, in general, a time required for the measurement of one ηL is 120 seconds.

In a method of producing the ethylene-based polymer to be described below, the value of $\eta L^{1,256\%}/\eta L^{10\%}$ can be increased by increasing the amount of radical initiator mixed to more than 0.03% by mass, and the value of $\eta L^{1,256\%}/\eta L^{10\%}$ can be decreased by reducing the amount of radical initiator mixed to less than 0.03% by mass.

A ratio of the intensity of the fifth harmonic to the intensity of the first harmonic (I5/I1) varies depending on the structure of the ethylene-based polymer. Specifically, the larger the distribution (bias) of the entangled branch structure of the ethylene-based polymer is, the larger the I5/I1 tends to be. Therefore, it is considered that $I5^{2,506\%}/I1^{2,506\%}$ is a parameter that reflects the distribution (bias) of the entangled branch structure.

In general, in the measurement of the response stress at a strain of $\gamma_0=2,506\%$, a sinusoidal shear strain of 0.05 Hz is applied to a sample for 6 cycles, and an average value of values obtained in the latter 3 cycles is a measured value. In general, a time required for the measurement of the response stress at the strain of $\gamma_0=2,506\%$ is 120 seconds.

In the same manner as described above, in general, the measurement of the response stress at a strain of $\gamma_0=10\%$ is performed first, and the measurement of the response stress is performed while increasing the strain of $\gamma_0$ stepwise. Specifically, the response stress is measured while increasing each of a strain of $\gamma_0=10\%$ to 100%, a strain of $\gamma_0=100\%$ to 1,000%, and a strain of $\gamma_0=1,000\%$ to 10,000% in 10 logarithmically evenly spaced steps. As described above, in general, a time required for the measurement of one response stress is 120 seconds.

In a method of producing the ethylene-based polymer to be described below, the value of $I5^{2,506\%}/I1^{2,506\%}$ can be increased by raising a temperature $T^C$ to higher than 210° C., and the value of $I5^{2,506\%}/I1^{2,506\%}$ can be decreased by lowering the temperature $T^C$ to lower than 210° C.

In the ethylene-based polymer according to the present embodiment, the following Expressions (1') and (2') are preferably satisfied, and the following Expressions (1") and (2") are more preferably satisfied, from the viewpoint of further reducing thickness unevenness of a film.

$$0.370 \leq \eta L^{1,256\%}/\eta L^{10\%} \leq 0.466 \quad (1')$$

$$0.370 \leq \eta L^{1,256\%}/\eta L^{10\%} \leq 0.440 \quad (1")$$

$$0.0282 \leq I5^{2,506\%}/I1^{2,506\%} \leq 0.0320 \quad (2')$$

$$0.0300 \leq I5^{2,506\%}/I1^{2,506\%} \leq 0.0320 \quad (2")$$

The ethylene-based polymer according to the present embodiment preferably has a melt flow rate (MFR) of 2 g/10 min or more and 6 g/10 min or less, and more preferably has a melt flow rate (MFR) of 3 g/10 min or more and 5 g/10 min or less, the MFR being measured at a temperature of 190° C. and a load of 2.16 kg, from the viewpoint of processing stability. Note that the MFR is measured at a temperature of 190° C. and a load of 2.16 kg according to the method A defined in JIS K7210-1.

The ethylene-based polymer according to the present embodiment preferably has a molecular weight distribution of 3 or more and 15 or less, and more preferably has 5 or more and 13 or less, from the viewpoint of processing stability. Note that the molecular weight distribution is a ratio of a weight average molecular weight Mw in terms of polystyrene to a number average molecular weight Mn in terms of polystyrene (Mw/Mn), Mw and Mn being measured by a gel permeation chromatography (GPC) method.

The GPC measurement is performed under the following conditions, and a peak is specified by defining a baseline on a chromatogram based on the description of ISO 16014-1.

(Measurement Conditions)

Apparatus: HLC-8121GPC/HT (manufactured by Tosoh Corporation)

GPC column: three TOSOH TSKgelGMH6-HTs 7.8 mm I.D.×300 mm (manufactured by Tosoh Corporation)

Mobile phase: Mobile phase is used by adding 0.1 w/V of BHT to orthodichlorobenzene (manufactured by Wako Pure Chemical Industries, Ltd., special grade).

Flow rate: 1 mL/min

Column oven temperature: 140° C.

Detection: refractive index detector (RID)

RID cell temperature: 140° C.

Sample solution injection amount: 300 μL

Sample solution concentration: 1 mg/mL

Standard substance for GPC column calibration: Standard polystyrenes manufactured by Tosoh Corporation were weighed in combinations as shown in Table 1, 5 mL of orthodichlorobenzene (the same composition as that of the mobile phase) was added to each of the combinations, and the mixture was dissolved in room temperature, thereby preparing the standard substance.

TABLE 11

| Combination 1 | F700 0.4 mg | F20 0.9 mg | A5000 1.2 mg |
| Combination 2 | F288 0.4 mg | F10 1.0 mg | A2500 1.2 mg |
| Combination 3 | F80 0.7 mg | F4 1.1 mg | A1000 1.3 mg |
| Combination 4 | F40 0.8 mg | F2 1.1 mg | A500 1.3 mg |

The ethylene-based polymer according to the present embodiment preferably has a crosslinked structure, from the viewpoint of reducing thickness unevenness of a film.

In addition, the ethylene-based polymer according to the present embodiment is preferably a high-pressure low-density polyethylene, from the viewpoint of reducing thickness unevenness of a film.

The high-pressure low-density polyethylene is a low-density polyethylene produced by a high-pressure radical polymerization method. In general, a high-pressure low-density polyethylene is produced by continuously polymerizing ethylene monomers at a pressure of 1,000 to 2,500 atm and 150 to 300° C. in the presence of oxygen or an organic peroxide as a polymerization initiator in a pressure-resistant polymerization reactor.

An MFR of the high-pressure low-density polyethylene is preferably 4 g/10 min or more and 30 g/10 min or less, more preferably 6 g/10 min or more and 30 g/10 min or less, and still more preferably 6 g/10 min or more and 25 g/10 min or less, from the viewpoint of reducing an extrusion load during formation of a film.

A density of the high-pressure low-density polyethylene is preferably 910 kg/m$^3$ or more and 930 kg/m$^3$ or less, more preferably 912 kg/m$^3$ or more and 925 kg/m$^3$ or less, and still more preferably 915 kg/m$^3$ or more and 920 kg/m$^3$ or less. Note that the density is measured according to the method A specified in JIS K7112-1980 after performing annealing described in JIS K6760-1995.

A molecular weight distribution of the high-pressure low-density polyethylene is preferably 5.0 or more and 15.0 or less, and more preferably 7.0 or more and 10.0 or less.

A melt flow rate ratio (MFRR) of the high-pressure low-density polyethylene is preferably 25 or more and less than 60, and more preferably 30 or more and 45 or less. Note that the MFRR refers to a ratio of an H-MFR to the MFR. The H-MFR is measured at a temperature of 190° C. and a load of 21.60 kg according to the method A defined in JIS K7210-1.

The ethylene-based polymer according to the present embodiment may be an ethylene-vinyl acetate copolymer. The ethylene-vinyl acetate copolymer is a copolymer having a monomer unit based on ethylene and a monomer unit based on vinyl acetate.

An MFR of the ethylene-vinyl acetate copolymer is preferably 10 g/10 min or more and 30 g/10 min or less, and more preferably 15 g/10 min or more and 25 g/10 min or less.

A content of the monomer unit based on vinyl acetate contained in the ethylene-vinyl acetate copolymer is preferably 10% by mass or more and 30% by mass or less, and more preferably 15% by mass or more and 25% by mass or less, with respect to 100% by mass of the ethylene-vinyl acetate copolymer.

A molecular weight distribution of the ethylene-vinyl acetate copolymer is preferably 3.0 or more and 7.0 or less, and more preferably 3.5 or more and 5.0 or less.

An MFRR of the ethylene-vinyl acetate copolymer is preferably 25 or more and less than 60, and more preferably 30 or more and 50 or less.

An example of a method of producing the ethylene-vinyl acetate copolymer can include a high-pressure radical polymerization method in which ethylene and vinyl acetate are copolymerized at 50 to 400 MPa and 100 to 300° C. in the presence of a radical initiator and in the presence or absence of an appropriate solvent or chain transfer agent. The MFR or the molecular weight distribution of the ethylene-vinyl acetate copolymer or the content of the monomer unit based on vinyl acetate in the ethylene-vinyl acetate copolymer can be controlled by adjusting the polymerization conditions of the high-pressure radical polymerization.

The ethylene-based polymer according to the present embodiment may contain a thermoplastic resin and a thermoplastic elastomer different from the high-pressure low-density polyethylene and the ethylene-vinyl acetate copolymer.

Examples of the thermoplastic resin and the thermoplastic elastomer different from the high-pressure low-density polyethylene and the ethylene-vinyl acetate copolymer can include linear low-density polyethylene, ultra-low-density polyethylene, an ethylene-α-olefin copolymer, an ethylene-(meth)acrylate copolymer, a metal salt of an ethylene-(meth)acrylate copolymer, an ethylene-methyl methacrylate copolymer, and ethylene-propylene copolymer rubber.

Contents of the thermoplastic resin and the thermoplastic elastomer different from the high-pressure low-density polyethylene and the ethylene-vinyl acetate copolymer is preferably 5% by mass or less, and more preferably 2, by mass or less, with respect to a total mass of 100% by mass of resin components contained in the ethylene-based polymer according to the present embodiment.

The ethylene-based polymer according to the present embodiment can include additives such as an antioxidant, a slipping agent, an antistatic agent, a processability improver, an anti-blocking agent, a weather-resistant stabilizer, a release agent, a flame retardant, a metallic soap, wax, an antifungal agent, an antibacterial agent, a filler, and a foaming agent, if necessary.

Examples of the antioxidant can include a phenolic stabilizer such as 2,6-di-t-butyl-p-cresol (BHT), tetrakis[methylene-3-(3,5-di-t-butyl-4-hydroxyphenyl)propionate]methane (manufactured by Ciba Specialty Chemicals Inc., trade name: IRGANOX (registered trademark) 1010), or n-octadecyl-3-(4'-hydroxy-3,5'-di-t-butylphenyl)propionate (manufactured by Ciba Specialty Chemicals Inc., trade name: IRGANOX (registered trademark) 1076), a phosphite stabilizer such as bis(2,4-di-t-butylphenyl)pentaerythritol diphosphite or tris(2,4-di-t-butylphenyl)phosphite, and a phenol phosphite bifunctional stabilizer such as 6-[3-(3-t-butyl-4-hydroxy-5-methylphenyl)propoxy]-2,4,8,10-tetra-t-butyldibenzo[d,f][1,3,2]dioxaphosphepin (manufactured by Sumitomo Chemical Co., Ltd., trade name: SUMILIZER (registered trademark) GP). A content of the antioxidant is preferably 0.001% by mass or more and 1% by mass or less, and more preferably 0.01, by mass or more and 0.1% by mass or less, with respect to a total mass of 100% by mass of the ethylene-based polymer.

Examples of the slipping agent can include erucamide, a higher fatty acid amide, and a higher fatty acid ester. A content of the slipping agent is preferably 0.01% by mass or more and 1% by mass or less, and more preferably 0.05% by mass or more and 0.5% by mass or less, with respect to the total mass of 100% by mass of the ethylene-based polymer.

Examples of the antistatic agent can include a glycerin ester of a fatty acid having 8 to 22 carbon atoms, sorbitan acid ester, and polyethylene glycol ester. A content of the antistatic agent is preferably 0.01% by mass or more and 1% by mass or less, and more preferably 0.1% by mass or more and 0.5% by mass or less, with respect to the total mass of 100% by mass of the ethylene-based polymer.

An example of the processability improver can include a fatty acid metal salt such as calcium stearate. A content of the processability improver is preferably 0.01% by mass or more and 1% by mass or less, and more preferably 0.1% by mass or more and 0.5% by mass or less, with respect to the total mass of 100% by mass of the ethylene-based polymer.

Examples of the anti-blocking agent can include silica, diatomaceous earth, calcium carbonate, and talc. A content of the anti-blocking agent is preferably 0.1% by mass or more and 5% by mass or less, and more preferably 0.3% by mass or more and 3% by mass or less, with respect to the total mass of 100% by mass of the ethylene-based polymer.

Theses additives may be added to the ethylene-based polymer, and a masterbatch obtained by adding additives to an ethylene-based polymer may be mixed with the ethylene-based polymer. When two or more ethylene-based polymers are contained, the additives may be added after the two or more ethylene-based polymers are blended in advance, may be added to one ethylene-based polymer, or may be added to each of the ethylene-based polymers.

<Method of Producing Ethylene-Based Polymer>

A method of producing the ethylene-based polymer according to the present embodiment includes: a step (A) of melt-kneading a mixture containing an ethylene-based polymer and a radical initiator at a temperature $T^A$(° C.); a step (B) of melt-kneading the melt-kneaded product obtained in the step (A) at a temperature $T^B$(° C.); and a step (C) of melt-kneading the melt-kneaded product obtained in the step (B) at a temperature $T^C$(° C.), in which the following Expression (11) is satisfied:

$$T^A < T^B < T^C \qquad (11).$$

As the ethylene-based polymer contained in the mixture, various ethylene-based polymers such as the high-pressure low-density polyethylene, the ethylene-vinyl acetate copolymer, the linear low-density polyethylene, the ultra-low-density polyethylene, the ethylene-α-olefin copolymer, the ethylene-(meth)acrylate copolymer, the metal salt of an ethylene-(meth)acrylate copolymer, the ethylene-methyl methacrylate copolymer, and the ethylene-propylene copolymer rubber can be used.

As the radical initiator contained in the mixture, peroxide is preferred, and a cyclic organic peroxide represented by the following Formula (I) is more preferred.

[Formula 1]

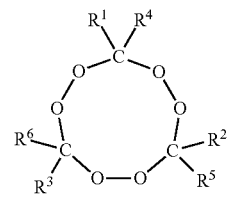

Here, $R^1$ to $R^6$ each independently represent an alkyl group having 1 to 12 carbon atoms, a phenyl group, or an alkyl-substituted phenyl group. Among them, it is preferable that $R^1$ to $R^6$ each independently represent an alkyl group having 1 to 12 carbon atoms. In addition, among $R^1$ to $R^6$, it is more preferable that $R^1$ to $R^3$ are alkyl groups having the same structures and $R^4$ to $R^6$ are alkyl groups having the same structures, and it is still more preferable that $R^1$ to $R^3$ are methyl groups and $R^4$ to $R^6$ are ethyl groups.

The radical initiator may be an organic peroxide other than the cyclic organic peroxide represented by Formula (I). Examples of the organic peroxide other than the cyclic organic peroxide represented by Formula (I) can include dicumyl peroxide, di-t-butyl peroxide, 2,5-dimethyl-2,5-di-(t-butylperoxy)hexane, 2,5-dimethyl-2,5-di(t-butylperoxy)hexyne-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxy benzoate, t-butylperoxy isopropyl carbonate, diacetyl peroxide, lauroyl peroxide, and t-butyl cumyl peroxide. These organic peroxides may be used alone or in combination of two or more thereof. Among them, 2,5-dimethyl-2,5-di-(t-butylperoxy)hexane is preferred from the viewpoint of ease of handling.

The amount of radical initiator mixed is preferably 0.03% by mass or more, more preferably 0.04% by mass or more, and still more preferably 0.05% by mass or more, with respect to the total mass of 100% by mass of the ethylene-based polymer contained in the mixture, from the viewpoint of strength of a molded body. The amount of radical initiator mixed is preferably 0.5% by mass or less, more preferably 0.4% by mass or less, and still more preferably 0.3% by mass or less, with respect to the total mass of 100% by mass of the ethylene-based polymer contained in the mixture, from the viewpoint of fluidity.

The temperature $T^A$ is preferably 95° C. or higher and 130° C. or lower, more preferably 100° C. or higher and 125° C. or lower, and still more preferably 105° C. or higher and 120° C. or lower. The temperature $T^B$ is preferably a temperature at which a half-life of the radical initiator is longer than 1 minute. Specifically, the temperature TV is preferably 130° C. or higher and 180° C. or lower, more preferably 135° C. or higher and 175° C. or lower, and still more preferably 140° C. or higher and 170° C. or lower. The temperature $T^C$ is preferably a temperature at which a half-life of the radical initiator is 1 minute or shorter. Specifically, the temperature $T^C$ is preferably 210° C. or higher and 320° C. or lower, more preferably 220° C. or higher and 310° C. or lower, and still more preferably 230° C. or higher and 300° C. or lower, from the viewpoint of productivity.

The time for melt-kneading at the temperature $T^A$(° C.) is preferably 0.1 minutes or longer and more preferably 0.5 minutes or longer, from the viewpoint of uniform dispersibility, and is preferably 30 minutes or shorter and more preferably 20 minutes or shorter, from the viewpoint of productivity. The time for melt-kneading at the temperature $T^B(° C.)$ is preferably 0.1 minutes or longer and more preferably 0.5 minutes or longer, from the viewpoint of uniform dispersibility, and is preferably 30 minutes or shorter and more preferably 20 minutes or shorter, from the viewpoint of productivity. The time for melt-kneading at the temperature $T^C(° C.)$ is generally a time equal to or longer than a half-life of the organic peroxide. Specifically, the time for melt-kneading at the temperature $T^C(° C.)$ is preferably 0.1 minutes or longer and more preferably 0.5 minutes or longer, from the viewpoint of strength of a molded body, and is preferably 30 minutes or shorter and more preferably 20 minutes or shorter, from the viewpoint of fluidity.

The melt-kneaded product obtained in each of the steps is preferably pellets.

As a melt-kneading apparatus, various known mixers such as a single-screw extruder, a twin-screw extruder, an open-type mixing roll, a closed-type Banbury mixer, a heat roll, and a kneader can be used. In the melt-kneading, all components to be kneaded may be collectively melt-kneaded or some components may be kneaded, and then, unselected components may be added and melt-kneaded.

In the method of producing the ethylene-based polymer according to the present embodiment, it is preferable that the step (A) is a step of performing melt-kneading using a melt-kneading extruder (a), the step (B) is a step of performing melt-kneading using a melt-kneading extruder (b), the step (C) is a step of performing melt-kneading using a melt-kneading extruder (c), and the melt-kneading extruder (a), the melt-kneading extruder (b), and the melt-kneading extruder (c) are different from each other. With such a configuration, workability can be improved.

Note that the same melt-kneading extruders may be used in any two steps of the step (A), the step (B), and the step (C), and the same melt-kneading extruders may be used in all the steps. In a case where the same melt-kneading extruders are used, a plurality of steps can be performed by changing the melt-kneading temperature stepwise in the melt-kneading extruders.

<Film>

A film according to the present embodiment contains the ethylene-based polymer.

The film according to the present embodiment is a multi-layer film including a substrate film and a film formed of the ethylene-based polymer. The substrate film may be a substrate film having one or two or more layers.

An example of the substrate film can include a film formed of a polyamide resin such as nylon 6 or nylon 66, a polyester resin such as polyethylene terephthalate or polybutylene terephthalate, cellophane, a paper, a paperboard, a fabric, an aluminum foil, stretched polypropylene, or polyethylene. The substrate film may include an anchor coat layer. The substrate film having two or more layers is obtained by dry-laminating or extrusion coating the respective layers.

An example of a method of producing the multi-layer film can include a method of melt-extruding a resin composition containing the ethylene-based polymer on a substrate film and laminating layers. By the extrusion coating process, it is possible to form a multi-layer film without molding defects such as edge break and film cracking. Therefore, the film according to the present embodiment is excellent in film formability. Note that the edge break is a phenomenon in which a molten film formed of an ethylene-based polymer is broken during the extrusion coating process. The film cracking is a phenomenon in which a long hole is generated at a part of a molten film formed of an ethylene-based polymer in a machine direction (MD direction) and a non-laminated part is thus generated.

In a case where the film formed of the ethylene-based polymer in the multi-layer film is used on a surface of the multi-layer film, the film is used as a sealant layer, and in a case where the film is used inside the multi-layer film, the film is used as an adhesive layer. In addition, in a case where the resin composition containing an ethylene-based polymer is laminated on a substrate film after being subjected to extrusion coating, the resin composition may be applied onto an anchor coat layer of the substrate film.

A thickness of the film according to the present embodiment is preferably 3 μm or more and 500 μm or less, and more preferably 5 μm or more and 300 μm or less.

Note that the ethylene-based polymer, the method of producing the ethylene-based polymer, and the film according to the present embodiment are not limited to the above embodiment, and various modifications can be made without departing from the gist of the present invention. In addition, configurations, methods, or the like of embodiments other than the above embodiments may be optionally employed and combined, and configurations, methods, or the like according to one embodiment may be applied to configurations, methods, or the like according to another embodiment.

EXAMPLES

Hereinafter, the present invention will be described in more detail with reference to Examples and Comparative Examples. However, the present invention is not limited to the following Examples.

<Melt Flow Rate (MFR, Unit: g/10 Min)>

A melt flow rate was measured at a temperature of 190° C. and a load of 2.16 kg according to the method A according to the method defined in JIS K7210-1.

Example 1

20 parts by mass of a radical initiator (manufactured by Kayaku Nouryon Corporation, Trigonox 301) was immersed in 80 parts by mass of a pulverized powder of an ethylene-based polymer (manufactured by Sumitomo Seika Chemicals Company, Ltd., FLO-THENE FG801NN). Masterbatch pellets (hereinafter, referred to as MB pellets) were prepared by melt-kneading the obtained immersed powder at 110° C. for 1 minute using a melt-kneading extruder (a) having a screw diameter of 30 mm (manufactured by UNIPLAS Corporation).

The obtained MB pellets were added to 100 parts by mass of an ethylene-based polymer (manufactured by Sumitomo Chemical Co., Ltd., SUMIKATHENE CE4506) so that a concentration thereof was 5,800 ppm, and the mixture was melt-kneaded at 150° C. for 1 minute using a melt-kneading extruder (b) having a screw diameter of 40 mm (manufactured by TANABE PLASTICS MACHINERY CO., LTD.), thereby obtaining pellets. The obtained pellets were melt-kneaded at 240° C. for 1 minute using another melt-kneading extruder (c) having a screw diameter of 40 mm (manufactured by TANABE PLASTICS MACHINERY CO., LTD.), thereby obtaining pellets.

The obtained pellets were left to stand at 150° C. for 5 minutes (pre-heat step), were pressurized at 150° C. and 5 MPa for 5 minutes (press step), and were gradually cooled at 25° C. for 5 minutes (gradual cooling step), thereby obtaining a press sheet having a thickness of 0.5 mm. A circular sheet having a diameter of 8 mm was punched out from the obtained press sheet to prepare a measurement sample. The obtained measurement sample was measured according to a LAOS method using a dynamic viscoelasticity measuring device (manufactured by TA Instruments, Inc., ARES-G2).

A viscosity $\eta L^{10\%}$ at the highest shear rate of the measurement sample at a strain of $\gamma_0=10\%$ and a viscosity $\eta L^{1,256\%}$ at the highest shear rate of the measurement sample at a strain of $\gamma_0=1,256\%$ were measured at a temperature of 150° C. and a frequency of 0.05 Hz. In each of the measurement of $\eta L^{10\%}$ and the measurement of $\eta L^{1,256\%}$, a sinusoidal shear strain of 0.05 Hz was applied to the measurement sample for 6 cycles, and an average value of values obtained in the latter 3 cycles was a measured value. In addition, the measurement of $\eta L^{10\%}$ was performed first, and the measurement of $\eta L^{1,256\%}$ was performed while increasing each of a strain of $\gamma_0=10\%$ to 100%, a strain of $\gamma_0=100\%$ to 1,000%, and a strain of $\gamma_0=1,000\%$ to 10,000% in 10 logarithmically evenly spaced steps. The ratio of $\eta L^{1,256\%}/\eta L^{10\%}$ was 0.430 and Expression (1) was satisfied.

In addition, an intensity $I1^{2,506\%}$ of a first harmonic and an intensity of $I5^{2,506\%}$ of a fifth harmonic were measured at a temperature of 150° C. and a frequency of 0.05 Hz, the intensities being obtained by Fourier-transforming (manufactured by TA Instruments, Inc., software name: TRIOS ver5.0.0) a response stress of the measurement sample at a strain of $\gamma_0=2,506\%$. In each of the measurement of $I1^{2,506\%}$ and the measurement of $I5^{2,506\%}$, a sinusoidal shear strain of 0.05 Hz was applied to the measurement sample for 6 cycles, and an average value of values obtained in the latter 3 cycles was a measured value. In addition, the measurement of the response stress at a strain of $\gamma_0=10\%$ was performed first, and the measurement of the response stress was performed while increasing each of a strain of $\gamma_0=10\%$ to 100%, a strain of $\gamma_0=100\%$ to 1,000%, and a strain of $\gamma_0=1,0001$ to 10,000% in 10 logarithmically evenly spaced steps. The ratio of $I5^{2,506\%}/I1^{2,506\%}$ was 0.0308 and Expression (2) was satisfied. The results are shown in Table 2.

The obtained pellets were extruded, laminated, and molded on a PET substrate having a thickness of 12 μm under conditions of a T-die inner width of 500 mm, an air gap of 140 mm, an ethylene-based polymer laminate thickness of 7 μm, a temperature directly below a T-die of 333° C., and a lamination speed of 150 m/min using a co-extrusion coating machine provided with a T-die having a width of 800 nu at a distal end of an extruder having a screw diameter of 65 mm (manufactured by Sumitomo Heavy Industries Modern, Ltd.). In the obtained laminate sample, a thickness of the ethylene-based polymer was measured in a width direction with a width of 200 mm at the central portion of the sample using a desk-top offline thickness gauge (manufactured by Yamabun Electronics Co., Ltd., TOF-5R01). A standard deviation of the obtained measured value was 0.67. The results are shown in Table 2.

Example 2

MB pellets were prepared in the same manner as that of Example 1. The obtained MB pellets were added to 100 parts by mass of an ethylene-based polymer (manufactured by Sumitomo Chemical Co., Ltd., SUMIKATHENE CE4506) so that a concentration thereof was 2,900 ppm, and the mixture was melt-kneaded at 150° C. using a melt-kneading extruder (b) having a screw diameter of 40 mm (manufactured by TANABE PLASTICS MACHINERY CO., LTD.), thereby obtaining pellets. The obtained pellets were melt-kneaded at 240° C. using another melt-kneading extruder (c) having a screw diameter of 40 mm (manufactured by TANABE PLASTICS MACHINERY CO., LTD.), thereby obtaining pellets.

As a result of measuring $\eta L^{1,256\%}/\eta L^{10\%}$ using the obtained pellets according to the LAOS method in the same manner as that of Example 1, $\eta L^{1,256\%}/\eta L^{10\%}$ was 0.383 and Expression (1) was satisfied. In addition, as a result of measuring $I5^{2,506\%}/I1^{2,506\%}$, $I5^{2,506\%}/I1^{2,506\%}$ was 0.0313 and Expression (2) was satisfied. The results are shown in Table 2.

An extruded and laminated sample was prepared using the obtained pellets in the same manner as that of Example 1, and a thickness of the ethylene-based polymer laminate layer having the central portion with a width of 200 mm was measured in a width direction. A standard deviation of the obtained measured value was 0.83.

Example 3

MB pellets were prepared in the same manner as that of Example 1. The obtained MB pellets were added to 100 parts by mass of an ethylene-based polymer (manufactured by Sumitomo Chemical Co., Ltd., SUMIKATHENE CE3049) so that a concentration thereof was 500 ppm, and the mixture was melt-kneaded at 150° C. using a melt-kneading extruder (b) having a screw diameter of 40 mm (manufactured by TANABE PLASTICS MACHINERY CO., LTD.), thereby obtaining pellets. The obtained pellets were melt-kneaded at 240° C. using another melt-kneading extruder (c) having a screw diameter of 40 mm (manufactured by TANABE PLASTICS MACHINERY CO., LTD.), thereby obtaining pellets.

As a result of measuring $\eta L^{1,256\%}/\eta L^{10\%}$ using the obtained pellets according to the LAOS method in the same manner as that of Example 1, $\eta L^{1,256\%}/\eta L^{10\%}$ was 0.463 and Expression (1) was satisfied. In addition, as a result of measuring $I5^{2,506\%}/I1^{2,506\%}$, $I5^{2,506\%}/I1^{2,506\%}$ was 0.0284 and Expression (2) was satisfied. The results are shown in Table 2.

An extruded and laminated sample was prepared using the obtained pellets in the same manner as that of Example 1, and a thickness of the ethylene-based polymer laminate layer having the central portion with a width of 200 mm was measured in a width direction. A standard deviation of the obtained measured value was 0.53.

Comparative Example 1

An immersed powder was prepared in the same manner as that of Example 1. The obtained immersed powder was added to 100 parts by mass of an ethylene-based polymer (manufactured by Sumitomo Chemical Co., Ltd., SUMIKATHENE CE4506) so that a concentration thereof was 5,800 ppm, the mixture was kneaded in advance, and the mixture was melt-kneaded at 240° C. using a melt-kneading extruder (c) having a screw diameter of 40 mm (manufactured by TANABE PLASTICS MACHINERY CO., LTD.), thereby obtaining pellets.

As a result of measuring $\eta L^{1,256\%}/\eta L^{10\%}$ using the obtained pellets according to the LAOS method in the same manner as that of Example 1, $\eta L^{1,2506\%}/\eta L^{10\%}$ was 0.438 and Expression (1) was satisfied. On the other hand, as a result of measuring $I5^{2,506\%}/I1^{2,506\%}$, $I5^{2,506\%}/I1^{2,506\%}$ was 0.0329 and did not satisfy Expression (2). The results are shown in Table 2.

An extruded and laminated sample was prepared using the obtained pellets in the same manner as that of Example 1, and a thickness of the ethylene-based polymer layer having the central portion with a width of 200 mm was measured in a width direction. A standard deviation of the obtained measured value was 1.05, and thickness unevenness was generated.

Comparative Example 2

As a result of measuring $\eta L^{1,256\%}/\eta L^{10\%}$ using pellets of an ethylene-based polymer (manufactured by Sumitomo Chemical Co., Ltd., SUMIKATHENE L420) according to the LAOS method in the same manner as that of Example 1, $\eta L^{1,256\%}/\eta L^{10\%}$ was 0.361 and did not satisfy Expression (1). In addition, as a result of measuring $I5^{2,506\%}/I1^{2,506\%}$, $I5^{2,506\%}/I1^{2,506\%}$ was 0.0329 and did not satisfy Expression (2). The results are shown in Table 2.

An extruded and laminated sample was prepared using the pellets in the same manner as that of Example 1, and a thickness of the ethylene-based polymer layer having the central portion with a width of 200 mm was measured in a width direction. A standard deviation of the obtained measured value was 1.45, and thickness unevenness was generated.

TABLE 2

| | | Example 1 | Example 2 | Example 3 | Comparative Example 1 | Comparative Example 2 |
|---|---|---|---|---|---|---|
| Melt-kneading temperature | $T^A$ [Extruder (a)] | 110° C. | 110° C. | 110° C. | — | — |
| | $T^B$ [Extruder (b)] | 150° C. | 150° C. | 150° C. | — | — |
| | $T^C$ [Extruder (c)] | 240° C. | 240° C. | 240° C. | 240° C. | — |
| Measurement according to LAOS method | $\eta L^{10\%}$ (Pa·sec) | 8867 | 8033 | 8546 | 9539 | 10175 |
| | $\eta L^{1,256\%}$ (Pa·sec) | 3811 | 3074 | 3956 | 4178 | 3670 |
| | $\eta L^{1,256\%}/\eta L^{10\%}$ | 0.430 | 0.333 | 0.463 | 0.438 | 0.361 |
| | $I1^{2,506\%}$ | 1.000 | 1.000 | 1.000 | 1.000 | 1.000 |
| | $I5^{2,506\%}$ | 0.0308 | 0.0313 | 0.0284 | 0.0329 | 0.0329 |
| | $I5^{2,506\%}/I1^{2,506\%}$ | 0.0308 | 0.0313 | 0.0284 | 0.0329 | 0.0329 |
| Polymer | MFR (g/10 mm) | 3.5 | 4.7 | 4.3 | 3.5 | 3.5 |
| Laminate sample | Standard deviation of thickness | 0.67 | 0.83 | 0.53 | 1.05 | 1.45 |
| | Thickness unevenness | Not generated | Not generated | Not generated | Generated | Generated |

What is claimed is:

1. An ethylene-based polymer, wherein the following Expressions (1) and (2) are satisfied:

$$0.362 \leq \eta L^{1,256\%}/\eta L^{10\%} \leq 0.466 \quad (1)$$

wherein,
$\eta L^{10\%}$ represents a viscosity (Pa·sec) at the highest shear rate of the ethylene-based polymer at a strain of $\gamma_0=10\%$ of the ethylene-based polymer measured by a large amplitude oscillatory shear (LAOS) method at 150° C. and 0.05 Hz, and
$\eta L^{1,256\%}$ represents a viscosity (Pa·sec) at the highest shear rate of the ethylene-based polymer at a strain of $\gamma_0=1,256\%$ of the ethylene-based polymer measured by the LAOS method at 150° C. and 0.05 Hz, and $$0.0282 \leq I5^{2,506\%}/I1^{2,506\%} \leq 0.0328 \quad (2)$$

wherein,
$I1^{2,506\%}$ represents an intensity of a first harmonic wave obtained by Fourier-transforming a response stress of the ethylene-based polymer at a strain of $\gamma_0=2,506\%$ of the ethylene-based polymer measured by the LAOS method at 150° C. and 0.05 Hz, and
$I5^{2,506\%}$ represents an intensity of a first harmonic obtained by Fourier-transforming a response stress of the ethylene-based polymer at the strain of $\gamma_0=2,506\%$ of the ethylene-based polymer measured by the LAOS method at 150° C. and 0.05 Hz.

2. The ethylene-based polymer according to claim 1, wherein the following Expressions (1') and (2') are satisfied:

$$0.370 \leq \eta L^{1,256\%}/\eta L^{10\%} \leq 0.466 \quad (1'), \text{ and}$$

$$0.0282 \leq I5^{2,506\%}/I1^{2,506\%} \leq 0.0320 \quad (2').$$

3. The ethylene-based polymer according to claim 1, wherein the following Expressions (1") and (2") are satisfied:

$$0.370 \leq \eta L^{1,256\%}/\eta L^{10\%} \leq 0.440 \quad (1''), \text{ and}$$

$$0.0300 \leq I5^{2,506\%}/I1^{2,506\%} \leq 0.0320 \quad (2'')$$

4. The ethylene-based polymer according to claim 1, wherein the ethylene-based polymer has a crosslinked structure.

5. The ethylene-based polymer according to claim 1, wherein the ethylene-based polymer is a high-pressure low-density polyethylene.

6. The ethylene-based polymer according to claim 1, wherein a melt flow rate of the ethylene-based polymer measured at a temperature of 190° C. and a load of 2.16 kg is 2 g/10 min or more and 6 g/10 min or less.

7. A method of producing the ethylene-based polymer according claim 1, the method comprising:
a step (A) of melt-kneading a mixture containing an ethylene-based polymer and a radical initiator at a temperature $T^A$(° C.);

a step (B) of melt-kneading a melt-kneaded product obtained in the step (A) at a temperature $T^B(°C.)$; and a step (C) of melt-kneading a melt-kneaded product obtained in the step (B) at a temperature $T^C(°C.)$, wherein the following Expression (11) is satisfied:

$$T^A < T^B < T^C \qquad (11).$$

8. The method of producing the ethylene-based polymer according to claim 7, wherein the step (A) is a step of performing melt-kneading using a melt-kneading extruder (a), the step (B) is a step of performing melt-kneading using a melt-kneading extruder (b), the step (C) is a step of performing melt-kneading using a melt-kneading extruder (c), and wherein the melt-kneading extruder (a), the melt-kneading extruder (b), and the melt-kneading extruder (c) are different from each other.

9. The method of producing the ethylene-based polymer according to claim 7, wherein the step (A) is a step of melt-kneading a mixture containing an ethylene-based polymer and a radical initiator, and an ethylene-based polymer.

10. The method of producing the ethylene-based polymer according to claim 7, wherein the radical initiator is peroxide.

11. A film comprising the ethylene-based polymer according to claim 1.

* * * * *